US005186897A

United States Patent [19]

Eason et al.

[11] Patent Number: 5,186,897

[45] Date of Patent: Feb. 16, 1993

[54] MULTIANALYTE TEST VEHICLE

[75] Inventors: Stephen W. Eason, Redgrave; John W. Attridge, Weybridge; Simon Degroot, Woking, Knaphill, all of United Kingdom

[73] Assignee: Ares-Serono Research & Development Limited Partnership, Boston, Mass.

[21] Appl. No.: 613,575

[22] PCT Filed: Apr. 11, 1990

[86] PCT No.: PCT/GB90/00556

§ 371 Date: Dec. 4, 1990

§ 102(e) Date: Dec. 4, 1990

[87] PCT Pub. No.: WO90/11830

PCT Pub. Date: Oct. 18, 1990

[30] Foreign Application Priority Data

Apr. 11, 1989 [GB] United Kingdom ................. 8908112
Sep. 12, 1989 [GB] United Kingdom ................. 8920618

[51] Int. Cl.[5] ................................ G05D 7/00

[52] U.S. Cl. ...................... 422/100; 422/64; 422/103; 422/112; 422/115; 436/180; 436/809

[58] Field of Search .................. 422/58, 63, 64, 72, 422/100, 103, 112, 115; 436/45, 180, 809

[56] References Cited

U.S. PATENT DOCUMENTS 4,244,916 1/1981 Guigan ................................ 422/72
4,314,968 2/1982 Guigan ................................ 422/64
4,810,658 3/1989 Shanks et al. ......................... 422/73

*Primary Examiner*—James C. Housel
*Assistant Examiner*—Lyle A. Alexander
*Attorney, Agent, or Firm*—Ostrolenk, Faber, Gerb & Soffen

[57] ABSTRACT

The vehicle comprises a sample receiving reservoir (15), a plurality of test stations each comprising an FCFD or other capillary fill sensor cell (3), and passage (22) for providing fluid communication between the reservoir and a conduit with which end portions of said cells communicated such that in use sample from the reservoir may be fed to the plurality of cells substantially simultaneously. The vehicle makes it easier to know time zero for each assay. Passage (22) providing fluid connection may comprise at least one pore in a wall of the reservoir, the or each pore being of a size such that surface tension of the liquid normally prevents escape of ligand. Rotation of the vehicle breaks surface tension and liquid is released into the conduit.

19 Claims, 5 Drawing Sheets

FIG. 1.
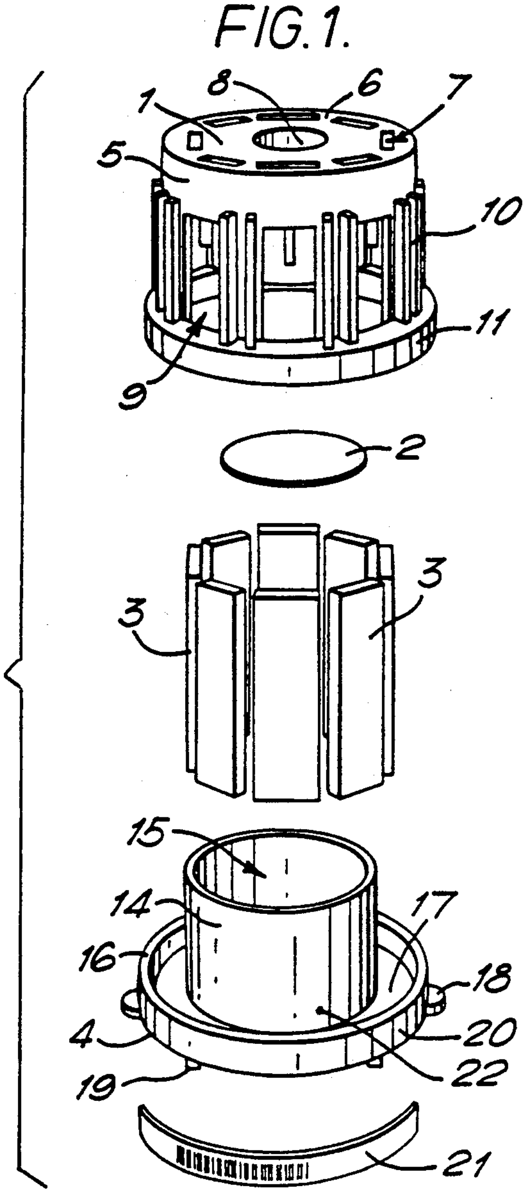
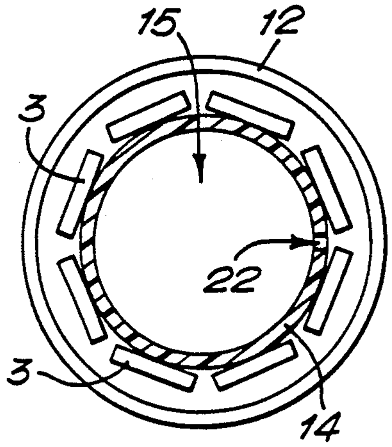
FIG. 2.

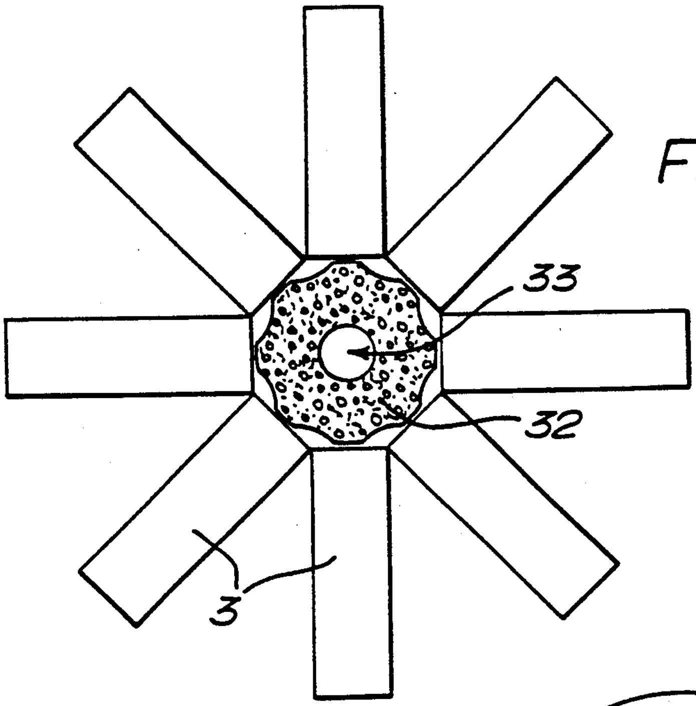
FIG. 7.
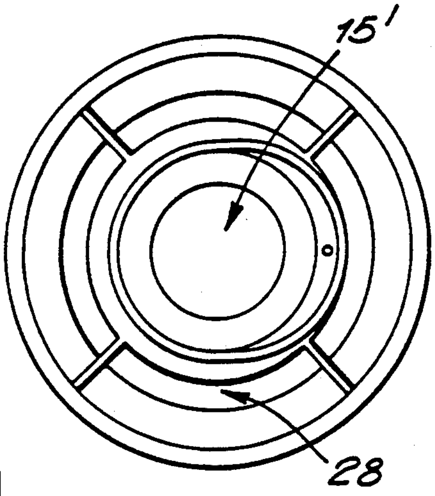
FIG. 8A.
FIG. 8B.
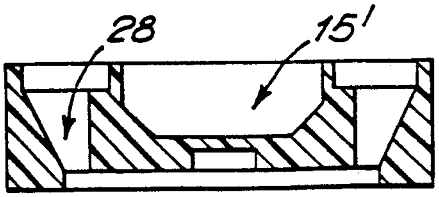
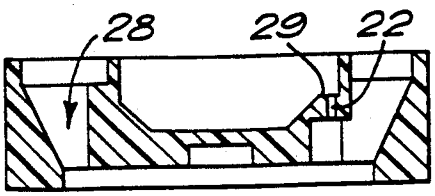
FIG. 8C.

MULTIANALYTE TEST VEHICLE

BACKGROUND OF THE INVENTION

This invention relates to a multianalyte test vehicle which may be used in diagnostics and monitoring particularly optical immunodiagnostics.

In the fields of diagnosis and monitoring e.g. patient health care, there have been two main approaches to the analysis of samples from patients The first approach is concerned with a generally qualitative evaluation of whether an analyte is present or whether the level of analyte in a test sample deviates from acceptable limits while the second approach is concerned with the quantitative evaluation of the amount of analyte in a sample.

Usually the diagnostic devices used in the first approach are relatively inexpensive and disposable. An example of such a device is the so-called dipstick device used to test for glucose in the urine of diabetics. The dipstick device comprises a test area which is usually loaded with several enzymes and a chromogen. In the example of testing for the presence of glucose, a liquid sample, usually urine, is applied to the test area and results in a colour change of the test area in only a few seconds. The colour change after a given time is broadly divided into three categories which are discernable by the naked eye in comparison with a colour chart, viz. normal, glucose present but below a certain concentration, and glucose present in unacceptable concentrations. It is relatively easy to see if a sample falls squarely within any one of the categories but it is difficult to decide on borderline samples especially as the sensitivity of such devices are seriously affected by their storage conditions (temperature, humidity etc). Nevertheless such devices are useful as they can give a qualitative answer with respect to a sample, their simplicity allows for their use by a person suffering from a chronic disorder or someone monitoring the presence of a particular substance and their inexpensiveness allows for their regular use. However, in many fields there is a need to make a quantitative assessment of the levels of analyte or different analytes in a sample.

In the past quantitative tests were performed individually by a skilled technician working in a laboratory under carefully controlled conditions. The high level of labour involved in effecting such tests made them very expensive; consequently attempts have been made to automate or partially automate these tests.

Many attempts at providing a multianalyte test apparatus have relied on metered sub-division of a sample into a number of aliquots; each aliquot being tested for a different analyte. Expensive pumping equipment and complicated purging systems were needed in these apparatus to control the consistent division of the sample and to avoid problems of contamination caused by earlier samples. The cost and complexity of this sort of apparatus has meant that it is usually located at hospitals, if concerned with medical samples, or central laboratories removed from the site where monitoring is needed e.g. when monitoring a food production line or river for contamination. The remoteness of the apparatus from the place where the sample is taken causes a delay in effecting the test and obtaining a result. Sometimes the delay is unacceptable. Thus there is a general need to provide a multianalyte test apparatus which avoids the disadvantages associated with prior art apparatus and which has some of the elements of simplicity and ease of use associated with disposable diagnostic devices.

Much work has been done in the field of optical biosensors in an effort to simplify multianalyte test apparatus. An optical biosensor is a small device which, together with its measuring instrument, uses optical principles quantitatively to convert chemical or biochemical concentrations or activities of interest into electrical signals. The sensor may incorporate biological molecules, such as antibodies or enzymes to provide a transducing element giving the desired specificity. The range of application of such sensors is vast although many requirements, such as working temperature range, sterilizability or biocompatibility, have limited range.

Recently, an optical biosensor for immunoassays, the fluorescence capillary-fill device (FCFD) has been proposed. The device is based on an adaptation of the technology used to mass manufacture liquid-crystal display (LCD) cells. The device uses the principles of optical fibres and waveguides to reduce the need for operator attention and it avoids the need for physical separation methods or washing steps in the assay. An FCFD cell typically comprises two pieces of glass which are separated by a narrow gap. One piece of glass is coated with a ligand and acts as a waveguide. The other piece is coated with a dissoluble fluorescent reagent which has affinity for the ligand (in competition assays) or the analyte (in non-competitive labelling assays). When a sample is presented to one end of the FCFD cell it is drawn into the gap by capillary action and dissolves the reagent. In a competitive assay the reagent and analyte compete to bind to the ligand on the waveguide and the amount of bound reagent is inversely proportional to the concentration of analyte. In an immunometric assay, the amount of reagent which becomes bound to the waveguide is directly proportional to the amount of analyte in the sample. As the gap between the pieces of glass is narrow (typically 0.1 mm) the reaction will usually go to completion in a short time, probably in less than 5 minutes in the case of a competition assay.

FCFD cells avoid the need for separation steps and/or washing steps by using an optical phenomenon known as evanescent wave coupling. Basically, the fluorescence from unbound reagent molecules in solution enters the waveguide which comprises the baseplate of the FCFD at relatively large angles (e.g. more than 44° for a serum sample) relative to the plane of the waveguide and emerge from the waveguide at the same large angles in accordance with Snell's Law of Refraction. On the other hand, reagent molecules bound to the surface of the waveguide emit light into all angles within the waveguide. By measuring the intensity of fluorescence at smaller angles to the axis of the guide (e.g. less than 44° for a serum sample), it is possible to assess the quantity of reagent bound to the surface thereby allowing the amount of analyte in the sample to be measured. The principles involved in FCFDs are described in more detail in U.S. Pat. No. 4,978,503.

As mentioned earlier the ligand bound to the waveguide is selected to suit the FCFD to a particular assay. Also, FCFDs allow for rapid tests without the need for accurate measurement of sample or reagent(s) and without the need for separation and washing steps. These factors suggest that FCFDs will be useful in simplifying multianalyte test apparatus. However, there is a need to provide an arrangement whereby the timing of the contact of sample with the FCFDs is controlled, since timing is important in rapid assays, and where the various FCFDs can be brought into alignment with both the light source acting as the fluorescence pump and the fluorescence detector which needs to be aligned with the end of the waveguide. Moreover, there is a need to avoid contamination of the optical surfaces of the FCFDs by stray sample or other matter which would affect optical quality.

SUMMARY OF THE INVENTION

Viewed from one aspect the invention provides a multianalyte test vehicle comprising a sample receiving reservoir, a plurality of test stations each comprising an FCFD or other capillary fill sensor cell, and means for providing fluid communication between the reservoir and a conduit (or spin collection chamber) with which the inlets ends of said cells communicate such that in use sample from the reservoir may be fed to the plurality of cells substantially simultaneously.

Thus, in accordance with the invention a plurality of different assay types may be run from one sample.

A test vehicle according to the invention in a multianalyte test apparatus also has the advantages that addition of the sample to each cell is governed by the apparatus and not the user and that time zero for each assay is known. This aspect of the invention is particularly applicable to FCFD cells, but the apparatus may comprise other sensors which take up fluid by capillary action.

Advantageously, the test cells are arranged about the outer periphery of the reservoir. The vehicle is preferably configured such that it has at least one plane of symmetry passing through an axis of rotation. For example, eight test cells may be equi-angularly spaced about the outer periphery of the reservoir (i.e. arranged concentric with and parallel to the axis of rotation). They may form a cylinder around the reservoir. They may also be arranged such that they form a cone. Preferably however they are horizontally disposed in a vane-like manner, extending outwardly from an axis of rotation of the device. The vehicle may include two or more reservoirs each arranged to feed sample to a plurality of FCFD cells whereby different samples could be accommodated. Thus, in the preferred arrangements discussed above, a cylindrical reservoir, for example, may include an internal dividing wall. In the presently preferred embodiments, however, the vehicle includes only a single reservoir.

Preferably, the means providing fluid connection between the reservoir and the test stations comprises at least one pore in or adjacent a side wall of the reservoir; the conduit may be in the form of a trough or well extending around, or around and under, the reservoir and communicating with the pore(s). The pore(s) may be at or near the base of the reservoir although, in one preferred embodiment, a pore is formed in an eccentric step in the reservoir. In the latter embodiment, the step assists in preventing sample reaching the pore until the device is rotated (as will be described later).

In one embodiment the conduit comprises an annular trough having an outer retaining wall with an inwardly facing "C" shape in vertical cross-section to provide an overhang for improved fluid retention. In another embodiment, the conduit comprises a well formed by a spin collection chamber which is preferably annular and concentric with the reservoir, and a shallow sump, which may extend under the reservoir. The shallow sump preferably contains an absorbent material to absorb excess sample. The spin collection chamber preferably includes vanes or baffles to aid partitioning of sample.

The pore or pores are preferably of a size so that surface tension of the liquid in the reservoir normally prevents the liquid from escaping whereby release of fluid from the reservoir may be achieved when desired by rotating the apparatus so that liquid moves by centrifugal force from the reservoir to the conduit. For example, with regard to the trough embodiment, the additional force exerted when the apparatus rotates quickly, say 300 to 500 rpm, is sufficient to break the surface tension and allow the liquid to flow out. The increase in centrifugal force with radius causes sample which has exited through a pore to be forced against the trough retaining wall. Slowing rotation causes the sample to fall into the trough(s) in which the end portions of FCFD cells extend. A gentle reversing action at this stage will ensure that the sample is evenly distributed to all the cells substantially simultaneously. The pore(s) is/are positioned in a gap between the FCFD cells so as to allow uninhibited passage of the sample from the pore(s) to the retaining wall.

In an alternative preferred embodiment comprising a step and spin collection chamber as aforesaid, sample is firstly forced onto the step upon rotation of the device. Sample then passes through the pore and is forced against an outer wall of the spin collection chamber. An inwardly facing lower lip preferably extends from this wall to prevent sample reaching the FCFD devices or the like until the device has stopped rotating. High speed rotation of the device causes sample to be evenly distributed around the outer wall of the chamber. When the speed of rotation of the device is decreased, sample tends to settle and is partitioned by the vanes or baffles. Stopping the device suddenly causes the sample to drop towards the FCFDs.

In order to improve the flow of sample in this embodiment, the riser of the step and lower portions of the wall of the spin collection chamber may slope up and away from the axis of rotation. Such an arrangement of the wall of the spin collection chamber leads to a more even distribution of liquid around the circumference of the chamber at a given speed of rotation and the wider upper portions of the chamber mean that the liquid can be more easily accommodated. Additionally, smaller volumes of sample are required.

A wall may be provided in the reservoir in order to funnel sample towards the pore. The funnelling of sample towards the pore leads to a more efficient transfer of liquid through the pore during rotational acceleration of the vehicle.

Advantageously, some form of air vent to the reservoir is provided so that a partial vacuum is not formed in the reservoir; a potential vacuum would inhibit outflow of sample. Preferably the air vent communicates with the conduit and thereby provides a pressure balancing port.

Instead of providing a small pore or pores it would be possible to provide suitable valve means opened by rotation of the device or opened mechanically, for example. Both of these arrangements though are more complicated than providing the simple, narrow bore pore or pores.

The test vehicle preferably comprises a plurality of parts made by injection moulding. For example, a two part embodiment may have an inner or base part which comprises the reservoir and part of the retaining wall while an outer or upper part may comprise (in embodiments having a cylindrical configuration) an FCFD cell support structure having windows for illumination and detection optics, a filling aperture and an upper part of the retaining wall. It will be clear to a skilled person that the more complex the construction of the vehicle the larger the number of subparts. For example, the embodiment comprising the step and spin collection chamber comprises three injection moulded parts. Once tests cells have been inserted into subassemblies, parts may be joined by, for example, ultrasonic welding.

Ribs may be provided adjacent to the windows to discourage finger contact with the optical surfaces and surfaces may be provided for the attachment of labels and bar codes.

Preferably surface irregularities at the optical edge of each FCFD i.e. the end of the waveguide from which emerging light is detected, are avoided since they will give rise to some degree of light scattering or dispersion and consequent mixing of the narrow angle light emission (attributable only to surface-bound fluorescent material) and the broader angle emissions. Such mixing inevitably degrades the signal quality and overall performance of optical assay techniques using FCFD's. Advantageously each optical edge is maintained in intimate contact with an index matching substance which itself also forms or intimately contacts a further optical component, such as a optical flat or lens.

Suitable liquid index matching substances, for example those having a refractive index in the range 1.35–1.65, include microscopy immersion fluids such as cedar oil and Canada balsam, and other liquids such as silicones, ethyl alcohol, amyl alcohol, aniline, benzene, glycerol, paraffin oil and turpentine. Appropriate gels include, for example, silicone gels. Suitable precursors for solids include adhesives such as epoxy and acrylate systems, and optical cements as well as plastics materials (including thermoplastics) with appropriate refractive index, for example silane elastomers. Alternatively, readily meltable solids e.g. naphthalene, may be applied in molten form and then allowed to cool and solidify.

The sub-parts are designed so that simple two part tooling may be used in their construction, thus lowering the tooling cost and improving quality. A preferred method of producing the pore includes the provision of a pin on a mould tool which results in the pore being formed during moulding. Alternatively, the pore or pores may be formed by a small core. Such a core may be removed before assembling the vehicle or it can be an inert plug which will dissolve when the liquid sample makes contact therewith. Another option is to provide the pore or pores after moulding e.g. by drilling or using a laser.

It is preferred to form the vehicle such that there is a space above the sample reservoir to receive an anti-splash filling aperture.

Although each FCFD cell will only take up a precise amount of liquid by capillary action there is a need to limit the amount of sample passing from the reservoir to the rest of the device otherwise unwanted flooding will occur. There are a variety of ways of controlling the amount of liquid which can leave the reservoir. Firstly, one can control the amount of liquid initially placed in the reservoir by using a pipette. The pipette may be graduated but the overall desire to provide a disposable device means that it is preferable to provide a blow-moulded bellows pipette which can only be inserted into the reservoir to a predetermined depth. Squeezing and releasing the bulb in this position causes all of the contents of the pipette to be ejected into the device, but any excess will be drawn back into the pipette.

Another way of controlling the amount of liquid which will pass from the reservoir involves locating a disc with a central hole in the reservoir such that the volume below or above the disc, as appropriate, substantially equals the volume to be dispensed When the test vehicle is spun, the sample will be flung out against the wall of the reservoir and the disc will divide the sample; one portion will flow out of the reservoir via the pore while the other portion remains separated from the pore by the disc.

In view of the fact that most samples will be biological and, in some instances may contain pathogens, it is desirable that excess sample is absorbed. To this end, an absorbent, such as a sponge may be provided.

The preferred method of communicating a sample with one or more test station(s) as discussed above combines structural simplicity with ease of operation, and may have applications where only a single FCFD cell is used or indeed in other assay types whether involving capillary fill cells or not.

Accordingly, viewed from a second aspect the invention provides a method of communicating a fluid sample with one or more sample test stations, comprising introducing the sample into a reservoir having at least one passageway in a wall or base thereof, the passageway being adapted such that release of sample from the reservoir is prevented in a stationary condition, and then rotating the reservoir and sample in such a way and at such speed whereby sample flows to the test station(s).

It is preferred that each passageway is a pore of such a size that surface tension of the sample is effective to prevent release of sample from the reservoir in a stationary, non-pressurised condition.

Viewed from a third aspect the invention provides a multianalyte test vehicle comprising a sample receiving reservoir, at least one test station and means for providing fluid communication between the reservoir and the test station(s), which means includes at least one pore in a wall of the reservoir, the pore being of a size such that surface tension of a liquid in the reservoir normally prevents egress of the liquid through the pore.

BRIEF DESCRIPTION OF THE DRAWINGS

Some embodiments of the invention will now be described, by way of example, with reference to the accompanying drawings, in which:

FIG. 1 is an exploded perspective view of one embodiment of a multianalyte test vehicle according to the invention;

FIG. 2 is a transverse section towards the base of the embodiment shown in FIG. 1;

FIG. 7 is a schematic plan showing the arrangement of parts of the embodiment of a test vehicle shown in FIGS. 5 and 6;

FIGS. 8A to 8C are a plan and sectional views of portions of a further embodiment according to the invention.

DESCRIPTION OF THE PREFERRED EMBODIMENTS

Figure 3A:
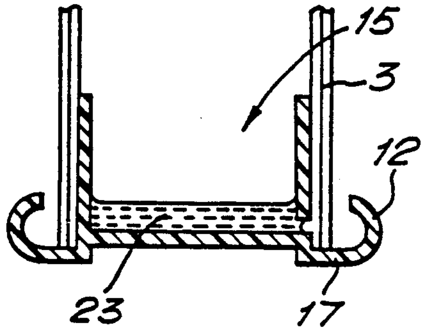
FIGS. 3(*a*) to 3(*c*) are schematic sectional elevations of the embodiment of FIG. 1 in use.

Similar reference numerals are used throughout for like parts of the different embodiments.

The embodiment of the vehicle according to the invention shown in FIG. 1 comprises an outer or upper part 1, a filter 2, a plurality of FCFD cells 3, and an inner or lower part 4. The upper part 1 is a generally cylindrical cap-shape having a wall 5 and a top 6. Windows 7 are equi-angularly spaced around the top 6. A hole 8 is provided in the top 6 to allow insertion of a liquid sample. The wall 5 has a plurality of windows 9 which are aligned with respective windows 7 in the top 6. Elongate projections 10 are provided next to the windows 9 so as to limit finger contact with the FCFD cells located in the vehicle. The wall 5 has a depending and outwardly projecting lip 11 which forms part of a retaining wall 12, as will be described later.

An optional filter 2 may be provided to stop particulate or gelatinous matter passing into the vehicle.

The lower or inner part 4 comprises a wall 14 defining a central cylindrical sample reservoir 15, a circumferential trough (a spin collection chamber) defined by part of the outer wall of the reservoir 15, a circumferential upstanding lip 16 and a web 17 which forms the base of the trough. Locating lugs 18 and guides 19 project from the lower part 4. A cylindrical wall 20, formed by the outer surface of the upstanding lip 16 provides an area upon which labels, such as a bar code 21, may be applied.

A pore 22 is provided in the wall of the reservoir 15. As can be seen in FIG. 2, the pore 22 is positioned in a gap between the FCFD cells 3 so as to allow uninhibited passage of sample from the pore 22 to the retaining wall 12. The pore will be described in more detail below after the assembly of the vehicle has been described.

A plurality of FCFD cells ready for use are located in the upper part 1 in alignment with the windows 7 and windows 9. The optional filter 2 is also located in the upper part 1. The upper and lower parts 1 and 4 are then brought into engagement; the lips 11 and 16 abutting each other and defining the retaining wall 12. The parts 1 and 4 are then secured together, preferably by the use of ultrasound but glue or tape may be used. The device is now ready for use.

After a sample has been added to the vehicle via the hole 8, the vehicle is then located on a rotatable head of a multianalyte test instrument (not shown) by means of the lugs 18 and guides 19 on the lower part 14. The head of the instrument is rotatable at about 300 to 500 rpm and can also be rotated in a stepping mode at low speed to bring each FCFD cell into alignment with the light source and with the fluorescence detector which aligns with the respective optical edge window 7 on the top of the vehicle Turning to FIG. 3, where some parts of the vehicle are not shown for the sake of clarity, it can be seen in FIG. 3(*a*) that a sample 23 is in the reservoir 15. The pore 22 is so sized that surface tension of the sample 23 normally prevents the sample from escaping through the pore 22.

Figure 3B:
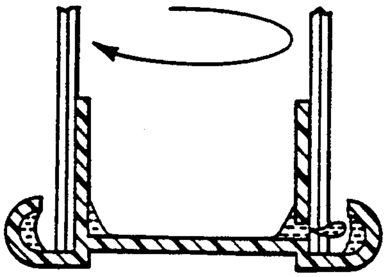
Figure 3C:
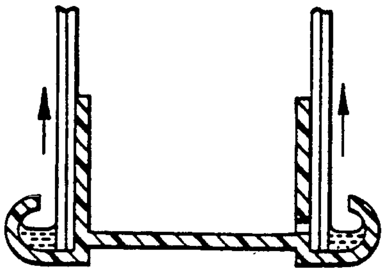

As the vehicle is rotated, as shown by the arrow in FIG. 3(*b*), the sample 23 is forced through the pore 22 by centrifugal force. The increase in centrifugal force with increasing radius causes each droplet of sample 23 which has exited through the pore 22 to be forced against the retaining wall 12.

Figure 4A:
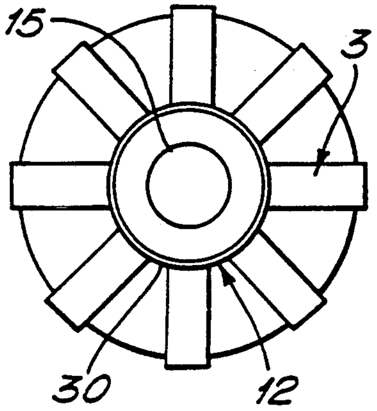
FIGS. 4(*a*) and 4(*b*) are top plan and side elevational views of a second embodiment of the invention.
Figure 4B:
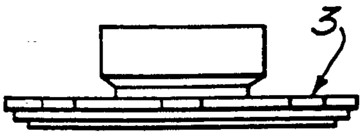

Slowing the rotation of the vehicle allows the sample 23 to sink into the trough, formed by the web 17, and then be drawn up the FCFD cells 3 by capillary action in the direction indicated by the arrows in FIG. 3(*c*). The time when the vehicle is slowed and stopped are known so it follows that time zero for each FCFD cell is also known. The instrument can then step the vehicle to bring each FCFD cell into alignment with the light source and fluorescence detector FIGS. 4(*a*) and 4(*b*) show, schematically, a second embodiment of the test vehicle. This again includes a central sample receiving reservoir 15 communicating with a trough bounded by a retaining wall 12 of "C" shape cross-section via a small pore (not shown) in a manner similar to the first embodiment. In the second embodiment, the FCFD cells 3 extend radially outwardly in a vane like arrangement on a disc 30. The inner ends of the cells communicate with the trough via slit like apertures in the retaining wall such that sample is drawn from the trough by capillary action in a horizontal plane. In this way any adverse effect gravity may have on the performance of the cells may be avoided. The disc 30 may include windows aligned with the cells for illumination thereof.

Figure 5:
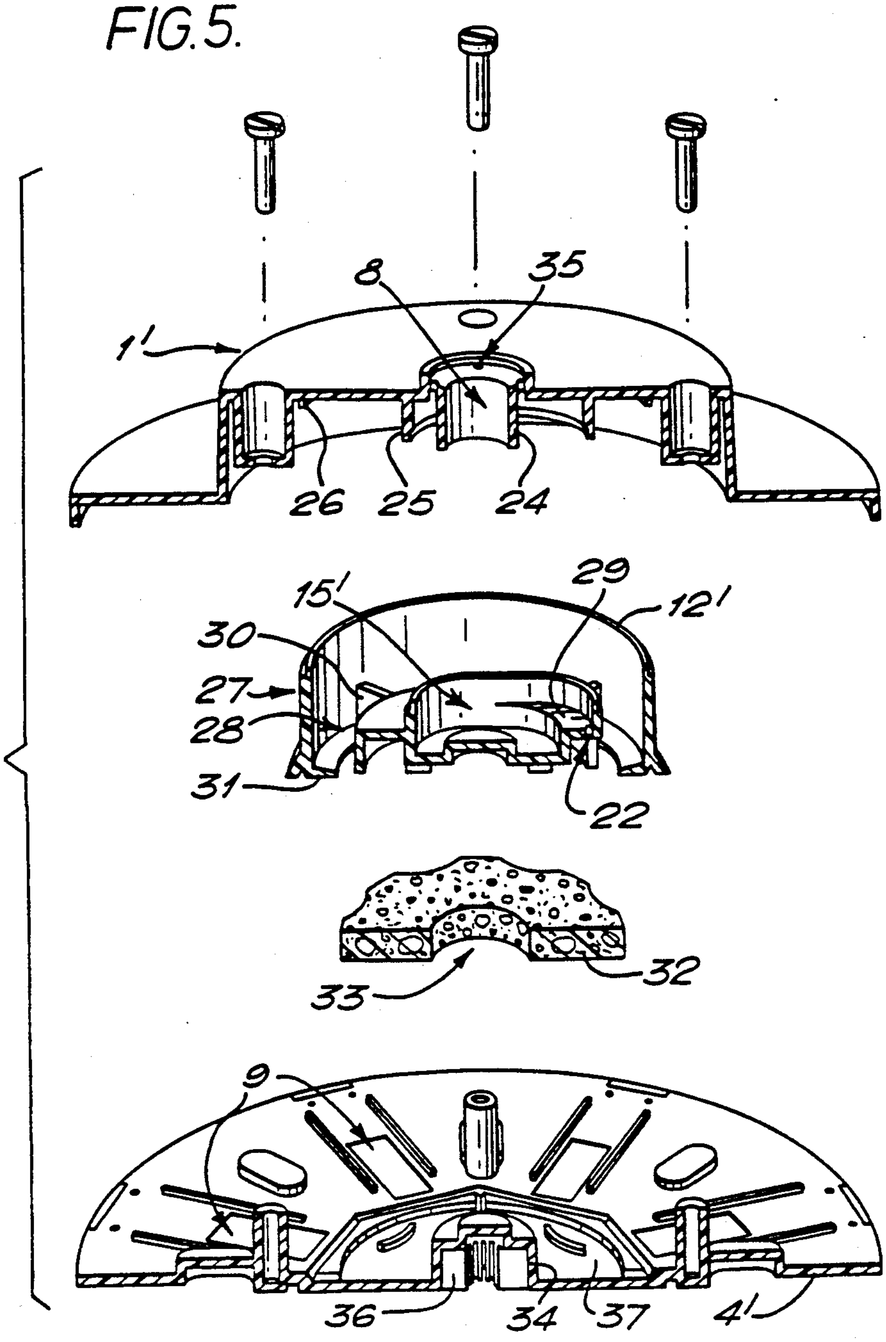
FIG. 5 is an exploded sectional view of a third embodiment of a test vehicle according to the invention.
Figure 6:
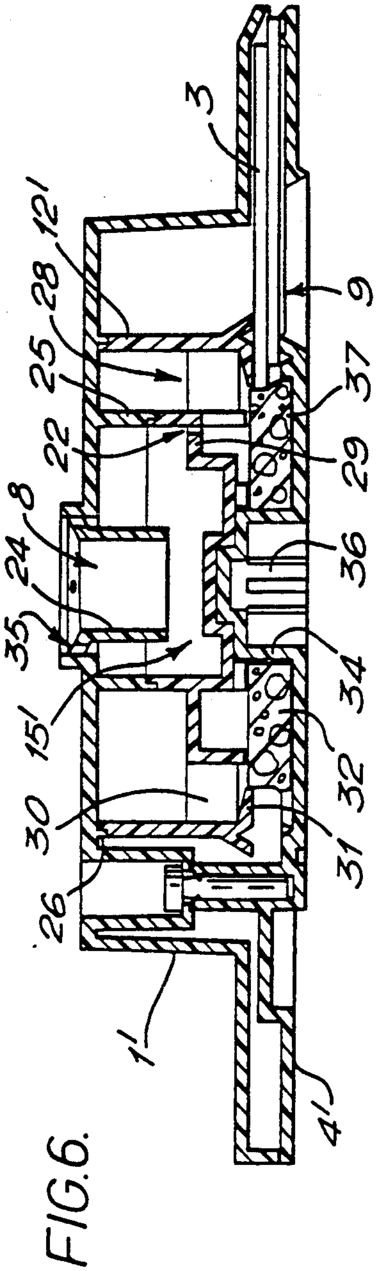
FIG. 6 is a stylised sectional view of the vehicle shown in FIG. 5 taken through two planes.

The embodiment depicted in FIGS. 5 to 7 comprises upper and lower casings 1' to 4' between which FCFDs are radially disposed in a vane-like manner (i.e. perpendicular to the axis of rotation), as shown schematically in FIG. 7. The upper casing 1' has a central filling hole 8, defined by a depending wall 24, and a pair of walls 25, 26 which co-operate with a moulding 27. The moulding 27 provides the sample reservoir 15' and a spin collection chamber 28. The reservoir includes an eccentric step 29 which has the pore 22 passing therethrough. The spin collection chamber 28 is, in part, defined by an outer retaining wall 12' connected to the reservoir 15' by four vanes 30. An inwardly facing lower lip 31 extends from the bottom of the retaining wall 12'. A sponge 32 is located below the moulding 27 in a shallow sump 37. The sponge 32 is formed with a central hole 33, in which a boss 34 of the lower casing 4' locates, and an indented periphery. Each FCFD 3 has a portion of sponge 32 in close proximity thereto.

It can be seen in FIGS. 5 and 6 that the upper casing 1' is provided with vents 35 to allow air to escape from the sample chamber during filling while the lower casing 4' has splines 36 inside the boss 34. The splines cooperate with a spindle of a multianalyte test instrument (not shown).

To fill the test vehicle with sample, a filling device (not shown) may be used which, for example, may cooperate with the depending wall 24 to provide a partial seal and avoid the possibility of spillage. As mentioned earlier, vents 35 are provided to allow for the escape of air as sample is introduced into the reservoir 15'.

The multianalyte test vehicle is mounted on the spindle of a multianalyte test instrument and rotated. Upon rotation of the device, sample is forced outwardly and upwardly. Due to the eccentric placement of the step 29, the sample gathers on the step 29 and is forced through the pore 22. Sample which has passed through the pore 22 impacts on the retaining wall 12' of the spin collection chamber 28. The inwardly facing lip 31 prevents sample descending into the shallow sump 37. As more sample leaves the reservoir 15' and impacts on the retaining wall 12' it spreads out, passing over the vanes 30 and becomes evenly distributed on the retaining wall 12'. Decreasing the speed of rotation of the device causes the sample on the retaining wall 12' to sag; the vanes 30 helping to partition it into equal aliquots. The device is then stopped suddenly. The inertia of the sample causes it to impact on the vanes 30, which are now stationary, and then descend. The sample flows over the inwardly facing lip 31 and passes over the inner ends of the FCFDs. Some of the sample is drawn into the FCFDs by capillary action. Excess sample descends into the shallow sump 37 and is absorbed by the sponge 32. The FCFDs can then be indexed to a test station of the instrument.

A multianalyte test vehicle according to the invention may be modified so as to improve the flow of liquid therein. For example the second embodiment described above may have certain components replaced by those shown in FIGS. 8 to 10.

FIGS. 8A to 8C illustrate an arrangement of reservoir 15' and spin collection chamber 28 in which the walls taper towards the axis of rotation. The tapering improves the flow of sample onto the step 29 and, once through the pore 22, the distribution of sample in the spin collection chamber 28. The sample tracks upwardly and outwardly against the wall of the chamber 28 and becomes evenly distributed. Better distribution of sample in the chamber may lead to less sample being required.

Figure 9:
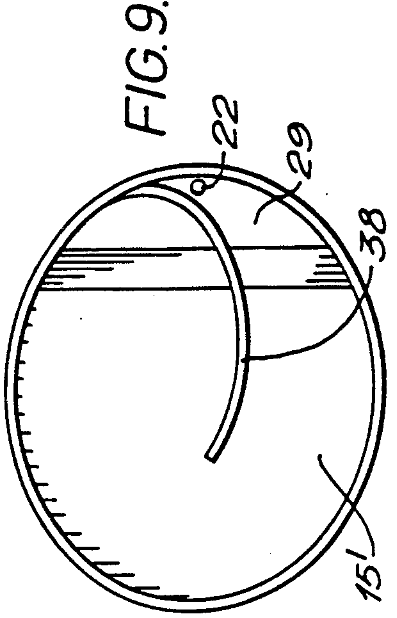

An internal wall 38 may be provided in the reservoir 15', as shown in FIG. 9, in order to assist in the movement of sample onto the step 29 and through the pore 22. When the reservoir is rotated in a clockwise direction sample is funnelled by the wall 38 and the outer wall of the reservoir towards the step 29. This funnelling of sample increase initial flow through the pore 22 during acceleration of the vehicle. This embodiment also includes a sloping riser for the step 29.

Figure 10:
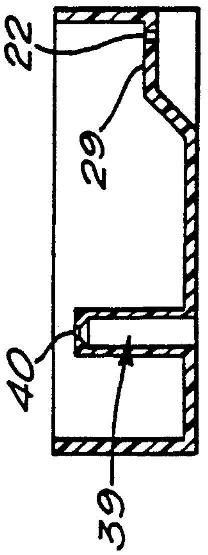
FIGS. 9 and 10 are respectively a plan and a sectional view of further embodiments of reservoirs for a test vehicle according to the invention.

FIG. 10 shows a further embodiment of the reservoir 15' which includes a sloping step 29 having a pore 22 therein and an air vent 39. The vent 39 includes a pore 40 which is too small to allow liquid to escape but will allow air into the reservoir to, for example, equilibrate the pressures in the reservoir and the spin collection chamber (not shown) on transfer of sample to the latter.

Vehicles according to the embodiments described above thus provide a simple and inexpensive arrangement for supplying sample to FCFD or other test cells. Modifications which fall within the scope of the present invention will be apparent to the skilled person.

We claim:

1. An apparatus for simultaneously communicating sample fluid to a plurality of capillary fill sensor cells, said apparatus comprising a rotatable test vehicle having a central reservoir for receiving sample fluid, an annular spin collection chamber surrounding said reservoir, and means for communicating sample fluid from said reservoir to said spin collection chamber upon rotation of said test vehicle, said test vehicle holding a plurality of capillary fill sensor cells with the inlet ends of said cells, when installed, in fluid communication with said spin collection chamber, whereby during use sample fluid flows from said reservoir to said spin collection chamber upon rotation of said test vehicle, where it contacts the inlet ends of said capillary fill sensor cells into which it flows by capillary action.

2. An apparatus according to claim 1 wherein said means for communicating sample fluid from said reservoir to said spin collection chamber comprises at least one passageway between said reservoir and said spin collection chamber.

3. An apparatus according to claim 2 wherein said passageway is located such that sample fluid communicates therewith only upon rotation of said test vehicle.

4. An apparatus according to claim 3 wherein said reservoir has a wall and a bottom and an eccentric step situated above the bottom of said reservoir on said wall and said passageway is located in or adjacent to said step, whereby during use sample fluid flows over said eccentric step and communicates with said passageway upon rotation of said test vehicle.

5. An apparatus according to claim 2 wherein said passageway comprises a pore of such size that during use surface tension prevents sample fluid from passing therethrough except upon rotation of said test vehicle.

6. An apparatus according to claim 1 wherein said spin collection chamber is constructed such that sample fluid collected therein during use does not contact the inlet ends of said capillary fill sensor cells until rotation of the test vehicle is slowed or stopped.

7. An apparatus according to claim 1 wherein said test vehicle is constructed so as to hold a plurality of capillary fill sensor cells concentric with and parallel to the axis of rotation of said test vehicle.

8. An apparatus according to claim 1 wherein said test vehicle is constructed so as to hold a plurality of capillary fill sensor cells concentric with and perpendicular to the axis of rotation of said test vehicle.

9. An apparatus according to claim 8 wherein said spin collection chamber has a lower lip extending inwardly from the outer wall thereof and terminating at a point just above the inlet ends of said capillary fill sensor cells when inserted, whereby during use sample fluid collects above said lower lip in said spin collection chamber upon rotation of said test vehicle, then flows inwardly and downwardly along said lower lip and contacts said inlet ends of said capillary fill sensor cells upon cessation of said rotation.

10. An apparatus according to claim 9 comprising absorbent material located below said lower lip such that excess sample fluid is absorbed therein during use.

11. An apparatus according to claim 1 having a plurality of capillary fill sensor cells installed therein.

12. An apparatus according to claim 11 wherein each of said capillary fill sensor cells comprises a waveguide and reagents for analysis of sample fluid.

13. An apparatus according to claim 6 having a plurality of capillary fill sensor cells installed therein.

14. An apparatus according to claim 13 wherein each of said capillary fill sensor cells comprises a waveguide and reagents for analysis of sample fluid.

15. An apparatus according to claim 9 having a plurality of capillary fill sensor cells installed therein.

16. An apparatus according to claim 15 wherein each of said capillary fill sensor cells comprises a waveguide and reagents for analysis of sample fluid.

17. A method of simultaneously communicating sample fluid to a plurality of capillary fill sensor cells comprising introducing the sample fluid into a central reservoir of a rotatable test vehicle, said test vehicle having an annular spin collection chamber surrounding said reservoir, at least one passageway for communicating sample fluid form said reservoir to said spin collection chamber upon rotation of said test vehicle, and a plurality of capillary fill sensor cells disposed about said test vehicle such that the inlet ends thereof are in fluid communication with said spin collection chamber, and rotating said test vehicle to allow sample fluid to flow from said reservoir to said spin collection chamber, whereby it contacts the inlet ends of said capillary fill sensor cells.

18. A method according to claim 17 wherein said passageway comprises a pore of such size that surface tension prevents passage of sample fluid therethrough except upon rotation of said vehicle.

19. A method according to claim 17 wherein said passageway is located such that sample fluid communicates therewith only upon rotation of said test vehicle.

* * * * *